Oct. 1, 1940.  E. S. HALL  2,216,343
MECHANISM
Filed March 27, 1939
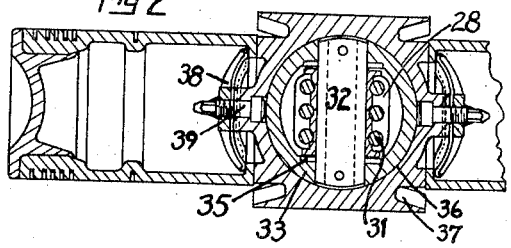
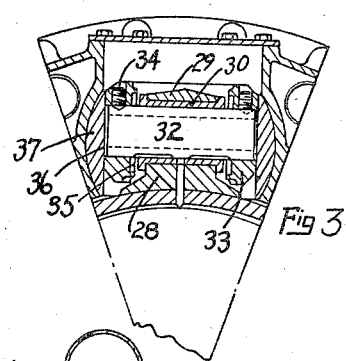
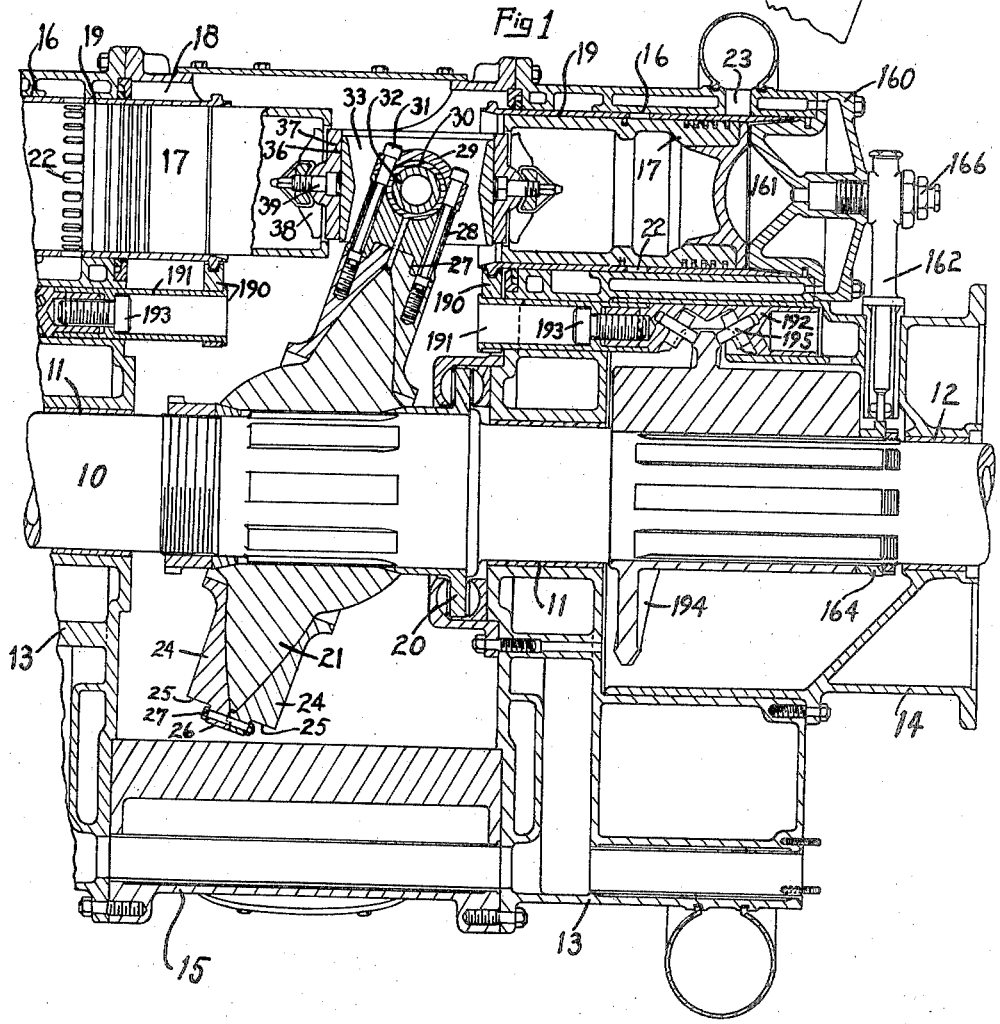
INVENTOR
Edwin S. Hall.

Patented Oct. 1, 1940

2,216,343

UNITED STATES PATENT OFFICE 2,216,343

MECHANISM

Edwin S. Hall, Farmington, Conn.

Application March 27, 1939, Serial No. 264,439

11 Claims. (Cl. 74—60)

This invention relates to mechanism for engines of the class having cylinders parallel to the shaft. The object of the invention is to provide improvements in the construction of wabbler mechanisms for parallel cylinder engines.

In discussing parallel cylinder engines, it is convenient to distinguish between a swashplate which rotates relative to the cylinders being ordinarily fixed upon the shaft, and a wabbler which does not rotate relative to the cylinders being mounted on bearings on and inclined to the shaft. A wabbler may be mounted on a swashplate, and an object of this invention is to provide improved constructions for wabblers of this type. A further object is to provide an improved wabbler construction, easier and less expensive to manufacture. Another object is to provide improved constructions for wabbler arms, to facilitate their production and assembly.

Good accessibility to the working parts of a parallel cylinder engine has not been easy to attain. An object of this invention is to provide a wabbler mechanism having good accessibility, the wabbler arm assemblies being removable from the wabbler thru handholes in the wabbler casing. A further object is to provide improved means for securing removable wabbler arms to the wabbler. Another object is to provide improved piston members comprising a crosshead portion and separable piston portions, with improved means for attaching the said portions to each other, in such a way that the pistons can follow the cylinders while the crosshead follows the crosshead guide even if the alinement is not perfect, the torque reaction being carried by the crossheads only.

These and other objects of the invention will be more clear from the following description in connection with the drawing in which Fig. 1 is a longitudinal section of a wabbler engine;

Fig. 2 is a radial or plan view, in section, of a piston member of the mechanism of Fig. 1; and Fig. 3 is a transverse section thru the midplane of the piston member of Figs. 1 and 2.

Referring to the drawing, shaft 10 is mounted in bearings 11 and 12 in cylinder blocks 13 and cylinder covers 14 respectively. Casing member 15 is interposed between and bolted to cylinder blocks 13. Formed in cylinder blocks 13 are cylinders 16 with their axes parallel to shaft 10. Shaft 10 is axially located by slipper thrust bearing 20. Swashplate 21 is fixed on shaft 10 in any suitable manner as by the splines and conical wedge pieces shown.

Wabbler 24, comprising two similar plate-like members bolted together, is operably mounted with suitable bearings on swashplate 21. The two parts of wabbler 24 are solids of revolution, their peripheral surfaces 25 and 26 being cylindrical and the intervening surfaces 27 being plane.

Wabbler arm assemblies are spaced about wabbler 24, each assembly comprising a pedestal member 28, cap 29, wristpin bushing 30, and capscrew 31, together with wristpin 32 locked in radial 33 by set screws 34. Pedestal 28 has inner surfaces cylindrical and plane conforming respectively to cylindrical surfaces 25 and 26 and plane surfaces 27 of wabbler 24, and, as shown in Fig. 1, are bifurcated to straddle the inner portions of the two members of wabbler 24 to assist in holding them together and for additional strength of the arm and its attachment to the wabbler. Capscrews 31 clamp wristpin bushing 30 between cap 29 and pedestal member 28, holding them securely to wabbler 24. Bushing 30 is free to rock and reciprocate on wristpin 32 as required by the operation of the mechanism, its axial movement being finally checked by the cushion action of loose fitting dashpots 35 formed in radial 33, coacting with the flanged ends of bushing 30 as pistons therein.

Radial 33 is operable in bore 36 in crosshead 37. Crosshead 37 is operable in cylindrical bore 18 formed in casing member 15 coaxial with cylinders 16. Pistons 17 are clamped to crosshead 37 by clamps 38 and screws 39.

Interposed between cylinders 16 and pistons 17 are sleeve valves 19 serving also as cylinder liners, and driven by any suitable mechanism such as that shown.

Operation of the mechanism is well understood, reciprocation of the piston members being accompanied by rotation of shaft 10. Pistons 17 and crosshead 37 reciprocate as a unit, and at the same time have some slight rotation peculiar to the wabbler mechanism. Radials 33 move with both oscillating rotation and reciprocation in bores 36, and similarly, bushings 30 move on wristpins 32 their axial movement being checked by the oil and air cushions forming in dashpots 35. Wabbler 24 with its several arms operating as a unit transmits the resultant piston thrusts to swashplate 21, causing rotation thereof with shaft 10.

Ordinarily wabblers have been made integral with their arms, and have been awkward members to manufacture and assemble. In this invention, wabbler 24 has a body comprising two plate-like members each of which is easily machined all over. To hold the two members securely together, they are best made with a stepped joint, with small bolts or screws for convenience in assembly. Then in accordance with this invention, pedestal members 28 are bifurcated and made to fit closely to the peripheral surfaces of wabbler 24, and are clamped solidly to it by screws 31. The shear load due to piston thrust on the wabbler arms is taken by the pedestal members 28 rather than by screws 31 which latter are subject only to tension loads due to the overturning moment of the thrust. Screws 31 also clamp caps 29 to secure bushings 30, the latter being formed with flanged ends not only to locate the bushings in the wabbler arm but to serve as pistons in dashpots 35. It is obvious that the parts of this construction are of such form as to be easily manufactured and assembled.

Also for ease of assembly, crossheads 37 are made separable from pistons 17. This construction also permits the choice of the most suitable materials for these members whose functions are so different. Pistons 17 are not piloted to crossheads 37, but are seated on plane surfaces and clamped by clamps 38 and screws 39 in such a manner that the pistons cannot take side-loading, and permitting correct alinement of pistons 17 in cylinders 16 even if cylinders 16 should not be quite coaxial with crosshead guides 18.

In the drawing, the coacting bearing surfaces between swashplate 21 and wabbler 24 are shown spherical; it is well-known that plane bearing surfaces could be used if desired, or antifriction bearings could be supplied. Moreover, the mechanism could be inverted, the swashplate comprising two members with the wabbler between them, or the wabbler might be mounted on a Z-crankshaft. With any such construction it is obvious that the wabbler could comprise a body portion substantially a solid of revolution as shown, with separable wabbler arms, in effect, keyed thereto, the bolts or screws holding them to the body portion not being subject to shear loads—a construction obviously easier to manufacture and assemble, yet of ample strength, and possessed of good accessibility.

While I have shown specific embodiments of the invention, it is understood that changes may be made in the arrangement and in the construction of the various parts without departing from the spirit and scope of the invention as set forth in the following claims.

I claim:

1. In an engine mechanism comprising a shaft, cylinders parallel to said shaft, and pistons operable in said cylinders: a wabbler mechanism operably connecting said pistons with said shaft and comprising a swashplate fixed on said shaft, a wabbler operably mounted on said swashplate and comprising two similar body portions formed substantially as solids of revolution, wabbler arms bifurcated and straddling the periphery of said body portions to assist in holding them together in operable position relative to said swashplate, and means for securing said arms to said body portions.

2. In an engine mechanism comprising a shaft, cylinders parallel to said shaft, and pistons operable in said cylinders: a wabbler mechanism operably connecting said pistons with said shaft and comprising a swashplate fixed on said shaft, a wabbler operably mounted on said swashplate and comprising two similar body portions formed substantially as solids of revolution, wabbler arms bifurcated and straddling the periphery of said body portions to assist in holding them together in operable position relative to said swashplate, each of said wabbler arms comprising a pedestal portion and a cap portion and a wristpin bushing, and means for clamping said bushing between said cap and pedestal portions and for securing said arm to said wabbler.

3. An engine mechanism comprising a shaft, cylinders parallel to said shaft, crosshead guide surfaces substantially coaxial with said cylinders, piston members operable in said cylinders and crosshead guide surfaces, and means operably connecting said piston members to said shaft, said piston members each comprising separable piston and crosshead portions abutting each other on plane surfaces without pilots and means for clamping said portions together in such a way that said piston portions may follow said cylinders and said crosshead portions may follow said crosshead guide surfaces, said clamping means including a clamp secured to said crosshead portion and engaging said piston portion permitting lateral movement and preventing axial movement thereof relative to said crosshead portion.

4. In an engine mechanism comprising a shaft, cylinders parallel to said shaft, and pistons operable in said cylinders: a wabbler mechanism operably connecting said pistons with said shaft and comprising a wabbler operably mounted on said shaft and having a body portion formed substantially as a solid of revolution, wabbler arms bifurcated and straddling the periphery of said wabbler, and means for securing said wabbler arms to said body portion.

5. In a wabbler mechanism, a shaft, cylinders parallel to said shaft, piston members operable in said cylinders and each having a transverse bore with its axis normally radial to said shaft, a wabbler operably mounted on said shaft and having a body portion formed substantially as a solid of revolution, and removable wabbler arm assemblies operably connecting said piston members with said wabbler, each of said assemblies comprising a radial crosshead rotatable and axially slidable in the corresponding bore of a piston member, a wristpin carried by said radial crosshead with its axis substantially in the midplane of said wabbler, a radial arm on said wabbler having a cylindrical bore rotatable and slidable axially upon said wristpin, said arm being bifurcated to straddle the periphery of said wabbler, and means for securing said arm to said body portion.

6. In an engine mechanism comprising a shaft, cylinders parallel to said shaft, and pistons operable in said cylinders: a wabbler mechanism operably connecting said pistons with said shaft and comprising a wabbler body operably mounted on said shaft and wabbler arm assemblies operably connecting said body with said pistons and including dashpot cushion means for checking abnormal rotation of said wabbler, each wabbler arm comprising a pedestal portion, a wristpin bushing, a cap, and means for clamping said wristpin bushing between said pedestal portion and said cap while securing said arm to said body, said bushing being flanged both to assist in holding said bushing in said arm and to serve as a piston in said dashpot cushion means.

7. In a wabbler mechanism, a shaft, cylinders parallel to said shaft, piston members operable in said cylinders and each having a transverse bore with its axis normally radial to said shaft, a wabbler operably mounted on said shaft and having a body portion formed substantially as a solid of revolution, and removable wabbler arm assemblies operably connecting said piston members with said body portion, each of said assemblies comprising a radial crosshead rotatable and axially slidable in the corresponding bore of a piston member, a wristpin carried by said radial crosshead with its axis substantially in the mid-plane of said wabbler, a radial arm on said wabbler including a flanged bushing rotatable and slidable axially upon said wristpin, cushion means for controlling the float of said wabbler and comprising annular recesses formed in said radial crossheads adjacent said wristpins coacting with the flanges of said bushings, and means for securing said arms to said wabbler body portion.

8. In a wabbler mechanism, a wabbler having a body formed as a solid of revolution about the wabbler axis, exterior surfaces of said wabbler body including cylindrical surfaces, wabbler arms having surfaces conforming to said cylindrical surfaces, and means for securing said wabbler arms to said wabbler body with said conforming surfaces in contact.

9. In a wabbler mechanism, a shaft, swashplate means mounted on said shaft, and a wabbler operably mounted on said swashplate means and comprising a body portion and separable wabbler arms, said body portion being formed as a solid of revolution about the wabbler axis with both plane and cylindrical exterior surfaces, surfaces on said wabbler arms conforming to said plane and cylindrical surfaces, and means for securing said arms to said body with said conforming surfaces in conforming position.

10. In an engine mechanism comprising a shaft, cylinders parallel to said shaft, and pistons operable in said cylinders: a wabbler mechanism operably connecting said pistons with said shaft and including a wabbler operably mounted on said shaft and comprising a body portion and separable wabbler arms, the mating surfaces of said body portion and said arms including plane surfaces normal to and cylindrical surfaces coaxial with the axis of said wabbler, and means for securing said wabbler arms to said body with the mating plane and cylindrical surfaces of said arms in contact with those of said body.

11. In a wabbler mechanism, a shaft, cylinders parallel to said shaft, piston members operable in said cylinders and each having a transverse bore with its axis normally radial to said shaft, a wabbler operably mounted on said shaft and comprising a body portion formed as a solid of revolution and removable wabbler arm assemblies operably connecting said piston members with said wabbler, each of said assemblies comprising a radial crosshead rotatable and axially slidable in the corresponding bore of a piston member, a wristpin carried by said radial crosshead with its axis substantially in the mid-plane of said wabbler, a radial arm on said wabbler having a cylindrical bore rotatable and slidable axially upon said wristpin, base surfaces on said wabbler arm conforming to the exterior surfaces of revolution of said wabbler body portion, and bolts substantially radial to said wabbler and securing said arm to said wabbler body.

EDWIN S. HALL.